US012589475B2

(12) United States Patent
Fretwell

(10) Patent No.: US 12,589,475 B2
(45) Date of Patent: Mar. 31, 2026

(54) SERVICE TOOL FOR COUPLING TO A SERVICE PORT RECEIVER ASSOCIATED WITH A GEARBOX

(71) Applicant: WALNAB PTY LTD, New South Wales (AU)

(72) Inventor: Mark Fretwell, New South Wales (AU)

(73) Assignee: WALNAB PTY LTD, New South Wales (AU)

( * ) Notice: Subject to any disclaimer, the term of this patent is extended or adjusted under 35 U.S.C. 154(b) by 393 days.

(21) Appl. No.: 18/310,220

(22) Filed: May 1, 2023

(65) Prior Publication Data

US 2023/0364757 A1 Nov. 16, 2023

(30) Foreign Application Priority Data

May 11, 2022 (AU) ................................ 2022901252

(51) Int. Cl.
*B25B 27/00* (2006.01)

(52) U.S. Cl.
CPC ................................ *B25B 27/0042* (2013.01)

(58) Field of Classification Search
CPC . B25B 27/00; B25B 27/0035; B25B 27/0042; F01M 11/04; F01M 11/0408; F01M 11/0425; F01M 11/0458; F01M 2011/0491; F16H 57/04; F16H 57/0408; F16K 15/063; F16K 15/182; F16L 37/24; F16L 37/35; F16L 37/42; F16L 37/44; F16N 21/00; F25B 45/00
See application file for complete search history.

(56) References Cited

U.S. PATENT DOCUMENTS

| | | | | |
|---|---|---|---|---|
| 1,094,514 | A | 4/1914 | Bishop | |
| 1,818,123 | A * | 8/1931 | Engbrecht | F01M 11/0408 184/1.5 |
| 2,506,722 | A | 5/1950 | Kuehn et al. | |
| 7,028,711 | B1 * | 4/2006 | Scott | F16L 37/44 251/149.9 |
| 10,094,514 | B1 * | 10/2018 | Sammataro | F01M 11/0408 |

OTHER PUBLICATIONS

Extended European Search Report issued Sep. 19, 2023 by the EPO in connection with EP23164042.6.

* cited by examiner

*Primary Examiner* — Robert J Scruggs
(74) *Attorney, Agent, or Firm* — Levenfeld Pearlstein, LLC

(57) ABSTRACT

A service tool releasably couples to a service port receiver connected to a service port associated with a gearbox. The tool includes a coupling for releasably coupling to the service port receiver. The coupling is configured for rotational movement about the receiver between a released and engaged positions. A locking actuator couples to the coupling arrangement for axial movement between locked and unlocked positions relative to the receiver. A plunger actuator connects to the fluid conduit and is slidably coupled to the coupling arrangement for movement between open and closed positions. In the open position, with the coupling arrangement in the engaged position and the locking actuator in the locked position, the plunger actuator contacts a check valve of the service port receiver and opens it to permit fluid flow between the gearbox and the fluid conduit via a fluid pathway formed at least in part by the plunger actuator.

10 Claims, 11 Drawing Sheets

SERVICE TOOL FOR COUPLING TO A SERVICE PORT RECEIVER ASSOCIATED WITH A GEARBOX

TECHNICAL FIELD

The present invention is broadly directed to a service tool for coupling to a service port receiver associated with a gearbox. The invention is also generally directed to in combination a service tool and service port receiver.

BACKGROUND OF INVENTION

Generally, gearboxes are fitted with one or two threaded plugs which must be removed from their respective ports for the removal of waste oil under gravity and for the refilling of replacement oil. This is a typical approach and practice for oil changes on all gearboxes. Although this style of plug is inexpensive and effective in sealing the associated port, the oil change process is often messy and slow as it relies on gravity to perform the effort to remove the oil. Furthermore, typically the oil must be collected in a reservoir which may or may not be easy to place under the port. This leads to waste oil running over the associated machinery, and potentially onto the floor presenting a slip hazard. In a crude attempt to avoid these problems operators have been known to directly screw a standard fluid coupling receiver into a wheel hub, even with a mismatched thread. The exposed receiver which remains with the wheel hub during normal operation poses a risk of impact and possible dislodgement of the standard receiver. This dislodgement or other damage to the receiver exposing the wheel hub port results in oil loss which during motion is likely to result in a very expensive and premature failure of the associated gearbox.

SUMMARY OF INVENTION

According to a first aspect of the present invention there is provided a service tool for coupling to a service port receiver associated with a gearbox, said tool comprising:

a coupling arrangement adapted to releasably couple to the service port receiver, the coupling arrangement configured for rotational movement about the service port receiver between (a) a released position where the coupling arrangement is released from the service port receiver permitting axial movement of said coupling arrangement relative to said service port receiver, and (b) an engaged position where the coupling arrangement engages the service port receiver preventing axial movement of said coupling arrangement relative to said service port receiver;

a locking actuator operatively coupled to the coupling arrangement and arranged for axial movement between (i) a locked position where the locking actuator releasably engages the service port receiver preventing rotation of the coupling arrangement thereby retaining it in the engaged position, and (ii) an unlocked position where the locking actuator disengages the service port receiver permitting rotation of the coupling arrangement to the released position for its release from said service port receiver;

a plunger actuator adapted for connection to a fluid conduit, said plunger actuator being slidably coupled to the coupling arrangement for movement between an open position and a closed position where in the open position, with the coupling arrangement in the engaged position and the locking actuator in the locked position, the plunger actuator is adapted to contact a check valve of the service port receiver and open it thereby permitting fluid flow between the gearbox and the fluid conduit via a fluid pathway formed at least in part by the plunger actuator;

the plunger actuator including a plunger member arranged for sliding movement within the coupling arrangement between the open and closed positions, the plunger member partly defining the fluid passageway;

the coupling arrangement including a coupling body surrounding at least part of the plunger actuator, and a key member having an operative end radially projecting inward of the coupling body for guided movement along an axially directed keyway formed in the plunger member of the plunger actuator during movement of said plunger actuator between its open and closed positions.

Preferably the locking actuator includes an elongated locking member adapted for axial movement into and out of engagement with a corresponding cavity of the service port receiver during movement of the locking actuator between its locked and unlocked positions, respectively.

Preferably the plunger member of the plunger actuator includes a circumferential groove formed continuous with the axially directed keyway and arranged with the plunger actuator in the open position for guided rotational movement of the plunger actuator within the coupling body toward a retained position preventing axial movement of the plunger actuator and thus retaining the check valve of the service port receiver in the open position. More preferably the circumferential groove extends only partly around the tubular actuator and includes an abutment for abutment with the operative end of the key member with the plunger actuator in the retained position whereupon the locking member of the locking actuator being engaged with the service port receiver limits further rotation of the plunger actuator relative to the service port receiver.

Preferably the service tool also comprises biasing means operatively coupled to the locking actuator for axial biasing of the locking member toward the locked position. More preferably the biasing means includes a compression spring located between the locking actuator and the plunger actuator, said spring acting against the plunger actuator which is restricted from axial movement relative to the coupling arrangement via interaction of the axially directed keyway of the plunger member of the plunger actuator and the key member of the coupling arrangement.

Preferably the plunger member of the plunger actuator is a tubular member of a blind configuration including a plurality of radially-directed fluid apertures at its blind end, said apertures being exposed on opening of the check valve to permit said fluid flow via the fluid pathway.

Preferably the coupling arrangement includes a coupling head having an oval-shaped opening formed partly by opposing and internally directed flanges adapted on part rotation of the coupling head about the service port receiver to interlock with a corresponding rebate on said service port receiver. More preferably the coupling head and the service port receiver are configured wherein the releasable engagement of the locking member of the locking actuator with the service port receiver occurs during the interlock of the coupling head and said service port receiver.

According to a second aspect of the invention there is provided in combination a service tool and service port receiver comprising:

(1) a service port receiver adapted for connection to a service port associated with a gearbox;

(2) a service tool comprising:

a coupling arrangement for releasable coupling with the service port receiver, said arrangement configured for rotational movement about the service port receiver between (a) a released position where the coupling arrangement is released from the service port receiver permitting axial movement of said coupling arrangement relative to said service port receiver, and (b) an engaged position where the coupling arrangement engages the service port receiver preventing axial movement of said coupling arrangement relative to said service port receiver, a locking actuator operatively coupled to the coupling arrangement and arranged for axial movement between (i) a locked position where the locking actuator releasably engages the service port receiver preventing rotation of the coupling arrangement thereby retaining it in the engaged position, and (ii) an unlocked position where the locking actuator disengages the service port receiver permitting rotation of the coupling arrangement to the released position for its release from said service port receiver;

a plunger actuator adapted for connection to a fluid conduit, said plunger actuator being slidably coupled to the coupling arrangement for movement between an open position and a closed position where in the open position, with the coupling arrangement in the engaged position and the locking actuator in the locked position, the plunger actuator is adapted to contact a check valve of the service port receiver and open it thereby permitting fluid flow between the gearbox and the fluid conduit via a fluid pathway formed at least in part by the plunger actuator;

the plunger actuator including a plunger member arranged for sliding movement within the coupling arrangement between the open and closed positions, the plunger member partly defining the fluid passageway;

the coupling arrangement including a coupling body surrounding at least part of the plunger actuator, and a key member having an operative end radially projecting inward of the coupling body for guided movement along an axially directed keyway formed in the plunger member of the plunger actuator during movement of said plunger actuator between its open and closed positions.

BRIEF DESCRIPTION OF DRAWINGS

In order to achieve a better understanding of the nature of the present invention a preferred embodiment of a service tool for coupling to a service port receiver associated with a gearbox will now be described, by way of example only, with reference to the accompanying drawings in which.

DETAILED DESCRIPTION

Figure 1:
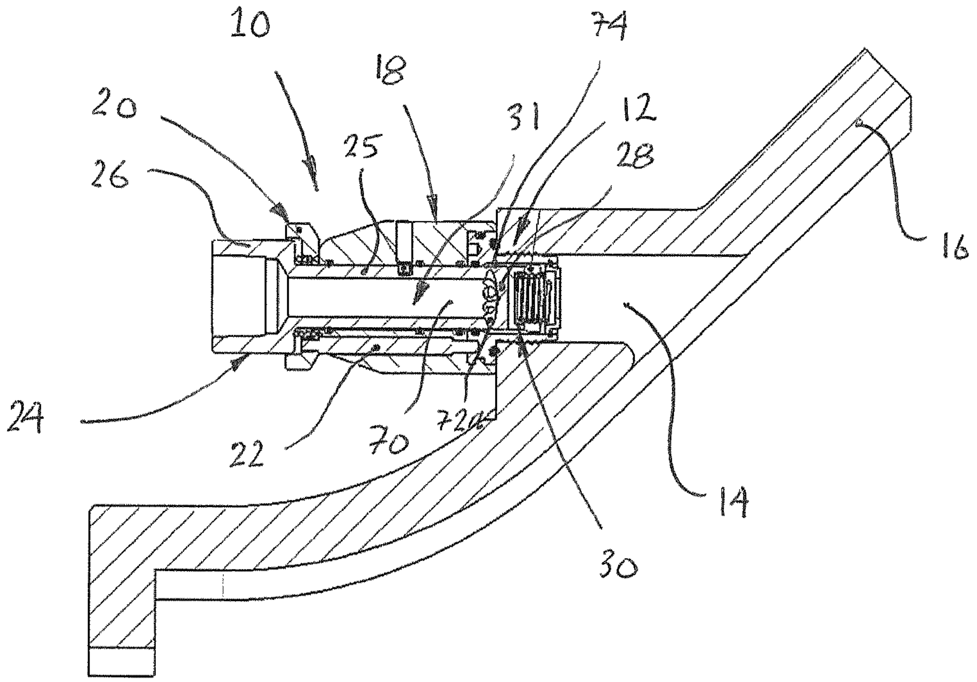
FIG. 1 is a sectional view of a preferred embodiment of a service tool for coupling to a service port receiver associated with a gearbox, said tool and receiver being constructed and operating according to both aspect of the present invention.

As seen in FIG. 1 there is a service tool 10 of a preferred embodiment of a first aspect of the present invention. In a second aspect of the invention the service tool 10 is releasably coupled to a service port receiver 12 connected to a service port 14 associated with a gearbox (not shown). In this example the gearbox is associated with a wheel hub 16 in which the service port 14 is located. It is to be understood that the service tool 10 of this embodiment is adapted for connection to a fluid conduit (not shown) for fluid transfer with the gearbox, typically engine oil or other hydrocarbons. The service tool 10 thus lends itself to oil changes for waste oil removal and refilling of the gearbox.

The service tool 10 of this embodiment broadly comprises:

1. a coupling arrangement 18 for releasably coupling to the service port receiver 12, the coupling arrangement 18 configured for rotational movement about said service port receiver 12 between a released position and an engaged position;
2. a locking actuator 20 operatively coupled to the coupling arrangement 18 and arranged for axial movement between a locked position and an unlocked position relative to the service port receiver 12;
3. a plunger actuator 24 adapted for connection to the fluid conduit, the plunger actuator 24 slidably coupled to the coupling arrangement 18 for movement between open and closed positions where in the open position, with the coupling arrangement 18 in the engaged position and the locking actuator 20 in the locked position, the plunger actuator 24 is adapted to contact a check valve 30 of the service port receiver 12 and open it thereby permitting fluid flow between the gearbox and the fluid conduit via a fluid pathway 31 formed at least in part by the plunger actuator 24.

Figure 2A:
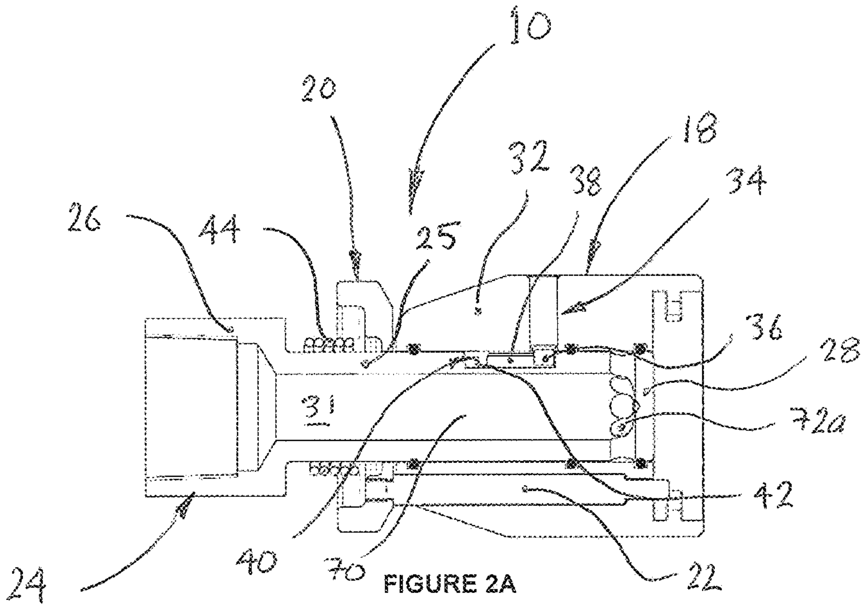
FIGS. 2A to 2C are half cutaway and front views of the service tool and service port receiver of the preferred embodiment of FIG. 1.
Figure 3A:
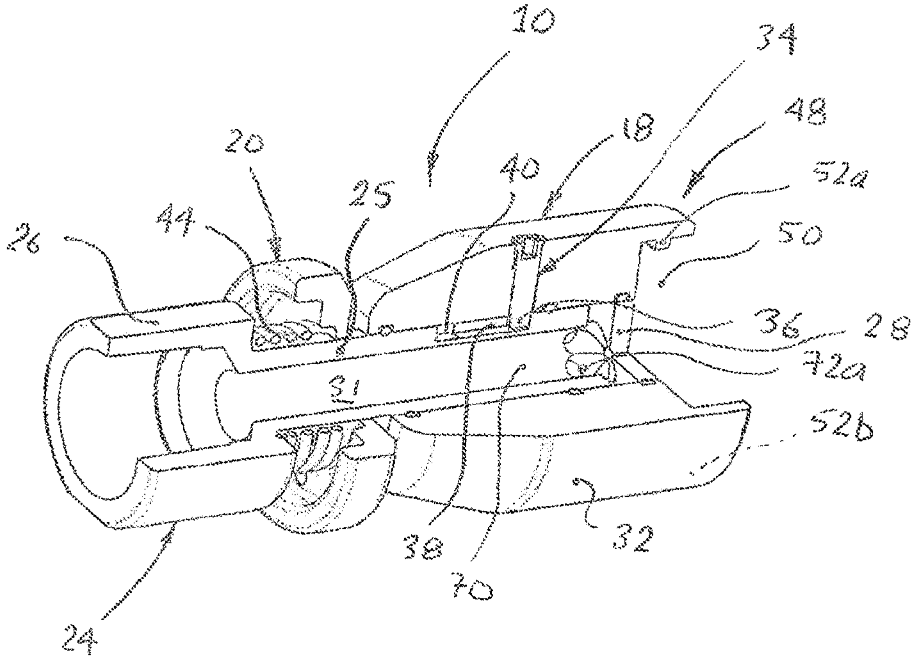
FIG. 3A is a quarter cutaway view shown in perspective of the service tool of the preferred embodiment of FIG. 1 according to the first aspect of the invention.
Figure 3B:
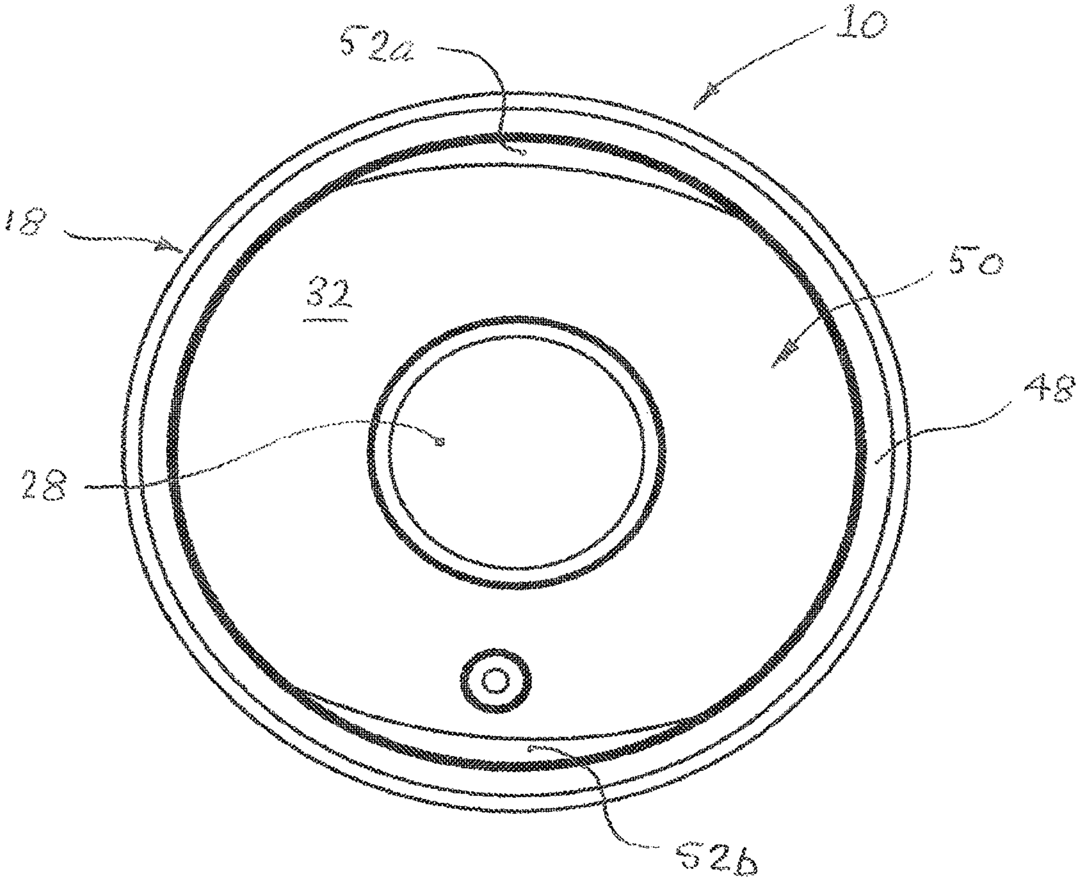
FIG. 3B is a front view of the service tool of the embodiment of FIG. 1 according to the first aspect of the invention.

As best seen in FIGS. 2A and 3A, the coupling arrangement 18 includes a coupling body 32 surrounding at least part of the plunger actuator 24. The coupling arrangement 18 also includes a key member 34 having an operative end 36 radially projecting inward of the coupling body 32. The key member 34 enables guided movement of the plunger actuator 24 between its open and closed positions. The operative end 36 of the key member 34 cooperates with an axially directed keyway 38 formed in a plunger member 25 of the plunger actuator 24. The plunger member is in the form of a tubular member 25 including a circumferential groove 40 formed continuous with the axially directed keyway 38. The circumferential groove 40 is arranged with the plunger actuator 24 in the open position for guided rotational movement of the plunger actuator 24 within the coupling body 32. This rotational movement of the plunger actuator 24 toward a retained position prevents axial movement of the plunger actuator 24 and thus retains the check valve 30 of the service port receiver 12 in the open position. In this example the circumferential groove 40 extends only partly around the tubular member 25 terminating in an abutment 42 for abutment with the operative end 36 of the key member 34. This means that with the plunger actuator 24 in the retained position and the locking actuator 20 engaged with the service port receiver 12 further rotation of the plunger actuator 24 is limited relative to said service port receiver 12.

The service tool 10 of this embodiment also comprises biasing means in the form of compression spring 44 operatively coupled to the locking actuator 20. The locking actuator 20 includes an elongated locking member 22 adapted for axial movement into and out of engagement with the service port receiver 12 during movement of said actuator 20 between its locked and unlocked positions. The compression spring 44 is located between the locking actuator 20 and an exposed end 26 of the plunger actuator 24 for axial biasing of the locking member 22 toward the locked position. In this example the service port receiver 12 includes a pair of opposing cavities in the form of blind holes 46*a* and 46*b* adapted for receipt of the locking member 22 with the locking actuator 20 in the engaged position. It is to be understood that the spring 44 acts against the plunger actuator 24 which is restricted from axial movement relative to the coupling arrangement 18 via interaction of the axially directed keyway 38 of the tubular member 25 and the key member 34 of the coupling arrangement 18.

Figure 4A:
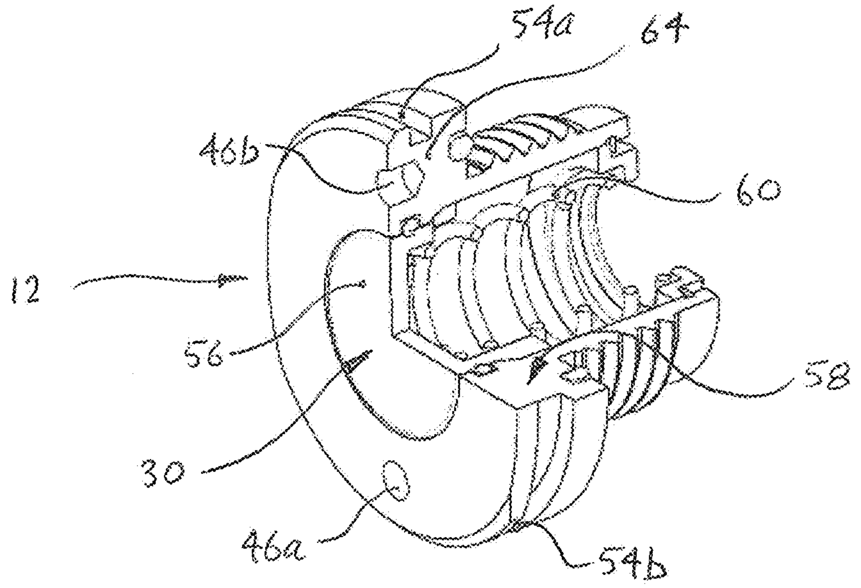
FIGS. 4A and 4B are quarter cutaway and front views of the service port receiver of the preferred embodiment of FIG. 1 according to the second aspect of the invention.
Figure 4B:
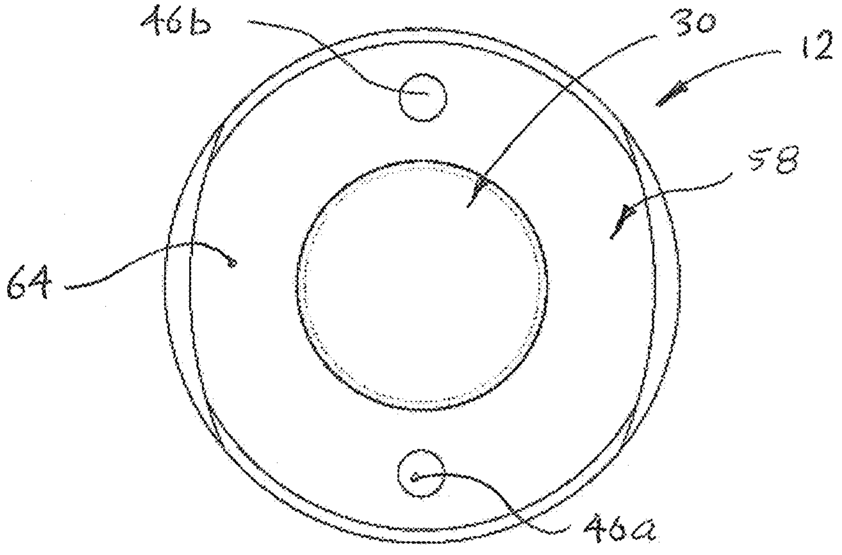
Figure 5:
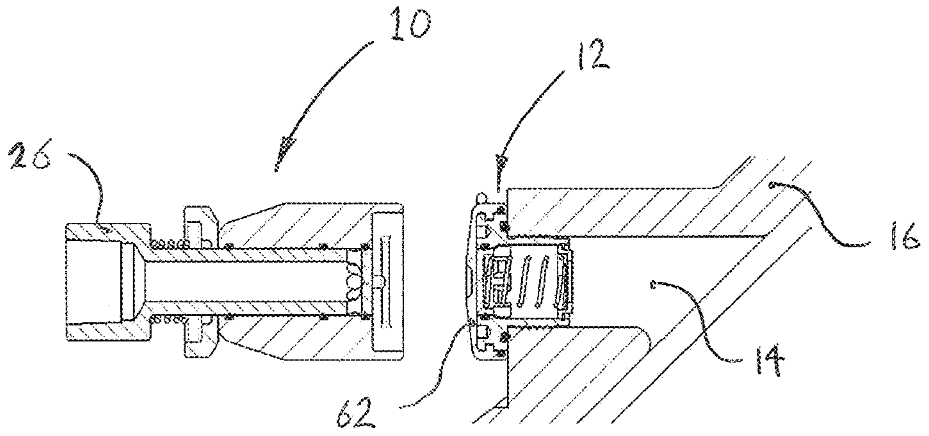
FIG. 5 is a sectional view of the service tool and service port receiver of the preferred embodiment of both aspects of the invention shown with the service tool in its released position prior to coupling to the service port receiver.
Figure 6:
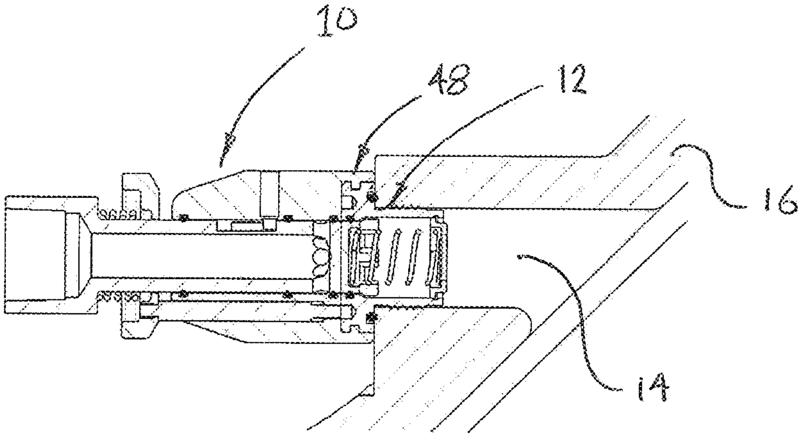
FIG. 6 is a sectional view of the service tool and service port receiver of the preferred embodiment of FIG. 5 depicted in an engaged and unlocked position relative to the service port receiver.
Figure 7:
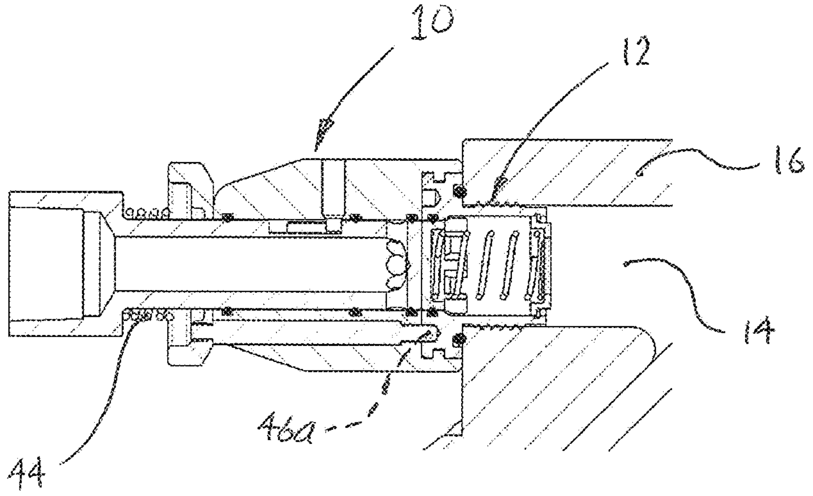
FIG. 7 is a sectional view of the service tool and service port receiver of the preferred embodiment of FIGS. 5 and 6 shown in an engaged and locked position relative to the service port receiver and prior to opening of the check valve of said receiver.
Figure 8:
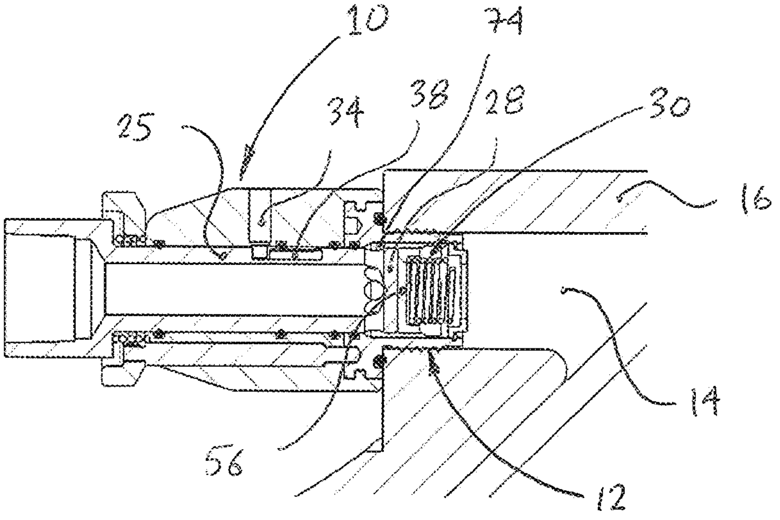
FIG. 8 is a sectional view of the service tool and service port receiver of the preferred embodiment of FIGS. 5 to 7 seen in the engaged and locked positions relative to the service port receiver with the plunger actuator moved into its open position for opening of the check valve of said receiver.
Figure 9:
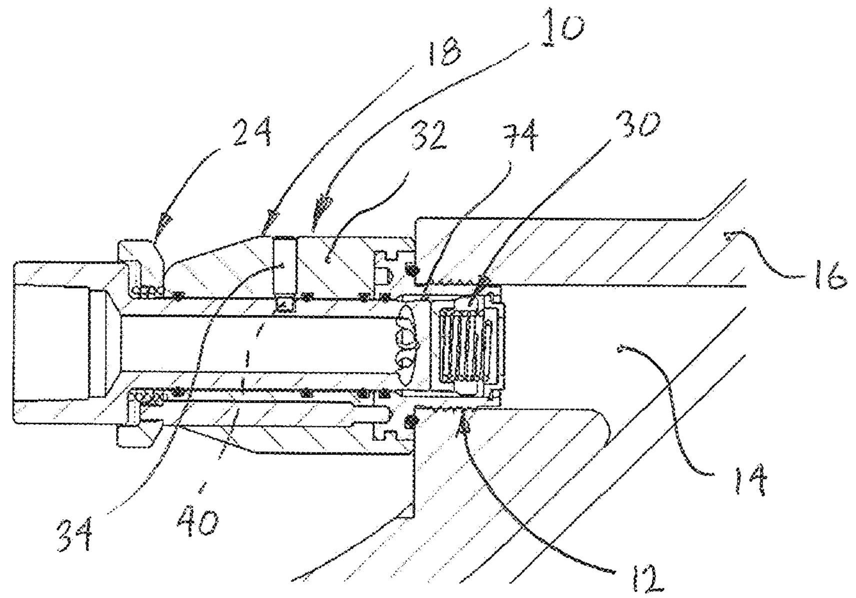
FIG. 9 is sectional view of the service tool and service port receiver of the preferred embodiment of FIGS. 5 to 8 shown in its engaged and locked positions with the locking actuator in the locked position retaining the check valve of said receiver in the open position.

As seen in FIGS. 3A/B and FIGS. 4A/B the coupling arrangement 18 of the service tool 10 includes a coupling head 48. The coupling head 48 of this embodiment has an oval-shaped opening 50 formed partly by opposing and internally directed flanges 52*a* and 52*b*. The flanges such as 52*a* are adapted on part rotation of the coupling head 48 about the service port receiver 12 to interlock with a corresponding rebate 54*a* and 54*b* on said service port receiver 12. It will be understood that the coupling head 48 and the service port receiver 12 are configured wherein the releasable engagement of the locking member 22 with the service port receiver 12 occurs during the interlock of the coupling head 48 and said service port receiver 12.

Figure 2B:
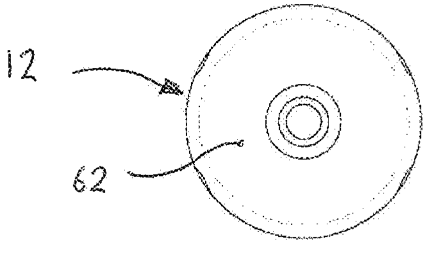
Figure 2C:
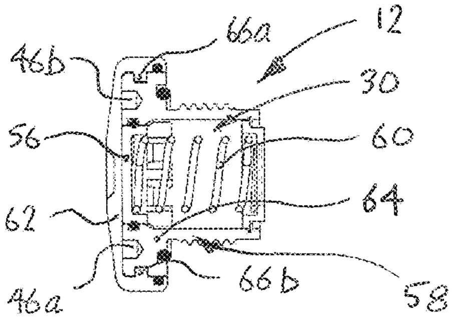

FIGS. 2B and 2C together with FIGS. 4A/B and 5 illustrate the service port receiver 12 to which the service tool 10 of this embodiment is releasably coupled in a second aspect of the invention. The service port receiver 12 includes the check valve 30 which cooperates with the plunger actuator 24 of the service tool 10 for opening and closure of the check valve 30. The check valve 30 includes a reciprocating poppet 56 slidably housed within a check valve body 58 which in this example is a screw fitment to the service port 14. The poppet 56 is biased closed via valve spring 60 housed within the check valve body 58. The service port receiver 12 includes a cover or cap 62 arranged for releasable connection with an exposed head 64 of the valve body 58. The cap 62 is of a similar coupling configuration to the coupling head 48 of the coupling arrangement 18 wherein it includes a pair of inwardly directed flanges 66*a* and 66*b*. The flanges such as 66*a* are configured to cooperate with corresponding rebates such as 54*a* on the exposed head 64 of the service port receiver 12 to enable interlocking between the cap 62 and the service port receiver 12. The cap 62 protects the poppet 56 and other moving parts of the service port receiver 12 from the ingress of dust or other foreign particulate.

Figure 10:
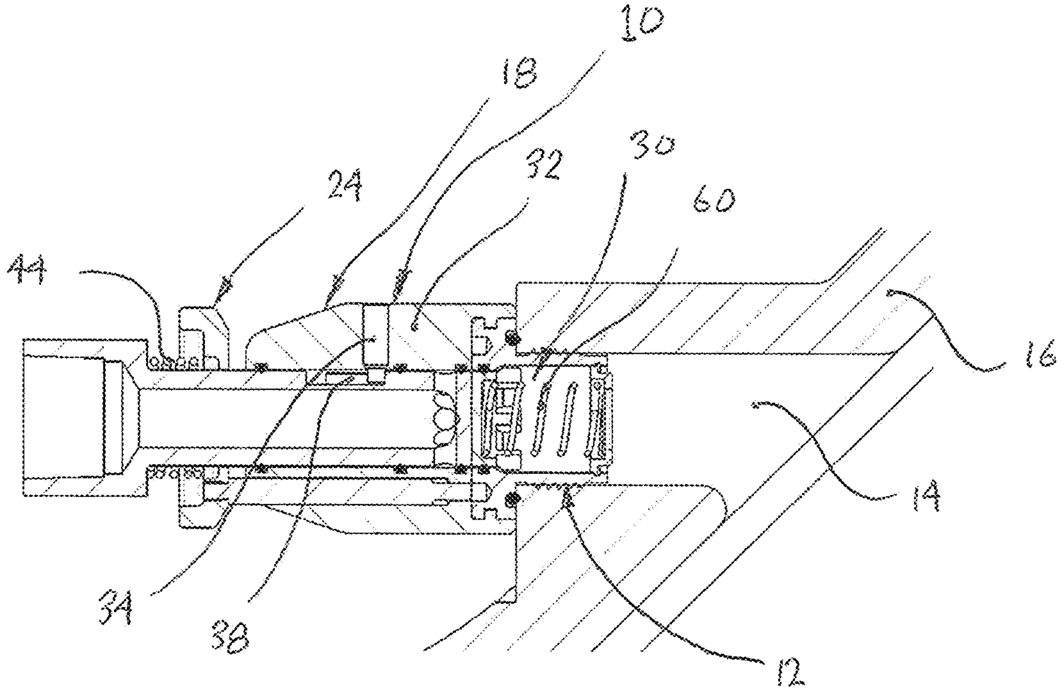
FIG. 10 is a sectional view of the service tool and service port receiver of the preferred embodiment of FIGS. 5 to 9 returned to its engaged and unlocked positions where the check valve of said receiver is closed.

FIGS. 5 to 10 illustrate operation of the service tool 10 of the preferred embodiment in conjunction with the service port receiver 12 according to both aspects of the invention. Although not illustrated, it is to be understood that the service tool 10 is connected at its exposed end 26 to a fluid conduit for filling and/or evacuation of fluid such as engine oil from a gearbox (not shown) associated with the service port 14. In the context of the described embodiment of the invention, the service tool 10 cooperates with the service port receiver 12 as follows:

1. the service tool 10 is disengaged from the service port receiver 12 in preparation for releasable coupling to said service port receiver 12 which is protected via the detachable cap 62 (see FIG. 5);
2. the detachable cap 62 is removed from the service port receiver 12 and the service tool 10 aligned with the service port receiver 12 wherein the coupling arrangement 18 of the service tool 10 is rotated from its released position toward the engaged position enabling interlocking of the coupling head 48 with said service port receiver 12 (see FIG. 6);
3. the coupling arrangement 18 is further rotated about the service port receiver 12 whereupon the locking member 22 aligns with one of the cavities such as 46*a* of said service port receiver 12 and is urged under the influence of the compression spring 44 into the locked position preventing continued rotation of the coupling arrangement 18 (see FIG. 7);
4. the plunger actuator 24 of the service tool 10 is slidably and axially displaced inward whereupon a contact end 28 of the tubular member 25 contacts the poppet head 56 of the check valve 30 of the service port receiver 12 urging it toward an open position, noting that guided axial movement of the key member 34 along the axial channel 38 of the tubular member 25 limits this action to translational movement without rotation (see FIG. 8);
5. the plunger actuator 24 of the service tool 10 is with the check valve 30 of the service port receiver 12 in its open position rotated within the coupling body 32 of the coupling arrangement 18 being guided by interaction of the key member 34 and the circumferential groove 40 toward the retained position preventing axial movement of the plunger actuator 24 and thus retaining the check valve 30 of the service port receiver 12 in the open position (see FIG. 9);
6. the plunger actuator 24 is rotated within the coupling body 32 of the coupling arrangement 18 in a reverse direction whereupon axial movement of the plunger actuator 24 is permitted under the guided interaction between the key member 34 and the axially directed keyway 38 under the influence of the compression spring 44, noting that the poppet spring 60 within the check valve 30 automatically effects its closure (see FIG. 10).

In order to release the service tool 10 from the service port receiver 12 the locking actuator 20 is pulled rearward against the biasing force of the compression spring 44 in order to disengage the locking member 22 from the service port receiver 12 to permit rotation of the coupling arrangement 18. The locking actuator 20 is rotated to effect a corresponding rotation of the coupling arrangement 18 from its engaged position to the disengaged position for release from the service port receiver 12. Alternatively, the coupling arrangement 18 itself may be rotated for disengagement and release from the service port receiver 12.

It is to be understood that the service tool 10 enables opening and closure of the check valve 30 of the service port receiver 12 permitting fluid flow through the fluid pathway 31 between the gearbox and the fluid conduit (not shown). Returning to FIG. 1, the fluid pathway 31 is formed by an elongated passageway 70 formed within the tubular member 25 which at the contacting end 28 is blind and formed continuous with a series of radially-extending apertures such as 72*a*. In the open position the plunger actuator 24 exposes the radial apertures such as 72*a* of the tubular member 25 to an annular fluid passageway 74 formed within the check valve body 58 of the service port receiver 12. The annular passageway 74 thus completes the fluid pathway 31 between the gearbox and the fluid conduit.

Now that a preferred embodiment of the invention has been described it will be apparent to those skilled in the art that the service tool for coupling to a service port receiver has at least the following advantages:

1. the service tool can be used with a conventional fluid receiver or fluid conduit together with a relatively low profile service port receiver without the risk of damaging this or associated equipment during its normal operation;
2. the service tool provides a relatively clean solution to the removal and refilling of fluids typically hydrocarbons without the mess associated with regular practices;
3. in its application to wheel hubs of mining vehicles and other mobile equipment, the service tool avoids the need where in some instances the wheel is to be rotated during conventional oil change practices;
4. in its application to wheel hubs of mining vehicles and other mobile equipment, the service tool enables the removal of gear oil (typically in the final drive gearbox) without it running down the wheel hub and onto the tyre and then ground;
5. the service tool and service port receiver lend themselves to dry-break lube fluid transfer capability in fixed or mobile plant equipment where a typical fluid receiver was previously considered too large to be of practical or safe use;
6. the service tool is designed for use with industry threads commonly used for hydrocarbon liquids and for example connects with existing receivers enabling customers to utilise existing fluid coupling products.

Those skilled in the art will appreciate that the invention as described herein is susceptible to variations and modifications other than those specifically described. For example, the locking actuator may depart from the bayonet-style connection of the preferred embodiment provided releasable engagement or latching of the service tool with the service port receiver is possible. The construction and operation of the plunger actuator may also vary provided its action in opening of the check valve of the service port receiver is independent of coupling of the service tool to said service port receiver.

All such variations and modifications are to be considered within the scope of the present invention the nature of which is to be determined from the foregoing description.

The invention claimed is:

1. A service tool for coupling to a service port receiver associated with a gearbox, said tool comprising:

a coupling arrangement adapted to releasably couple to the service port receiver, the coupling arrangement configured for rotational movement about the service port receiver between (a) a released position where the coupling arrangement is released from the service port receiver permitting axial movement of said coupling arrangement relative to said service port receiver, and (b) an engaged position where the coupling arrangement engages the service port receiver preventing axial movement of said coupling arrangement relative to said service port receiver, a locking actuator operatively coupled to the coupling arrangement and arranged for axial movement between (i) a locked position where the locking actuator releasably engages the service port receiver preventing rotation of the coupling arrangement thereby retaining it in the engaged position, and (ii) an unlocked position where the locking actuator disengages the service port receiver permitting rotation of the coupling arrangement to the released position for its release from said service port receiver;

a plunger actuator adapted for connection to a fluid conduit, said plunger actuator being slidably coupled to the coupling arrangement for movement between an open position and a closed position where in the open position, with the coupling arrangement in the engaged position and the locking actuator in the locked position, the plunger actuator is adapted to contact a check valve of the service port receiver and open it thereby permitting fluid flow between the gearbox and the fluid conduit via a fluid pathway formed at least in part by the plunger actuator;

the plunger actuator including a plunger member arranged for sliding movement within the coupling arrangement between the open and closed positions, the plunger member partly defining the fluid passageway;

the coupling arrangement including a coupling body surrounding at least part of the plunger actuator, and a key member having an operative end radially projecting inward of the coupling body for guided movement along an axially directed keyway formed in the plunger member of the plunger actuator during movement of said plunger actuator between its open and closed positions.

2. The service tool as claimed in claim 1 wherein the locking actuator includes an elongated locking member adapted for axial movement into and out of engagement with a corresponding cavity of the service port receiver during movement of the locking actuator between the locked and unlocked positions, respectively.

3. The service tool as claimed in claim 2 wherein the plunger member of the plunger actuator includes a circumferential groove formed continuous with the axially directed keyway and arranged with the plunger actuator in the open position for guided rotational movement of the plunger actuator within the coupling body toward a retained position preventing axial movement of the plunger actuator and thus retaining the check valve of the service port receiver in the open position.

4. The service tool as claimed in claim 3 wherein the circumferential groove extends only partly around the plunger member and includes an abutment for abutment with the operative end of the key member with the plunger actuator in the retained position whereupon the locking member of the locking actuator being engaged with the service port receiver limits further rotation of the plunger actuator relative to said service port receiver.

5. The service tool as claimed in claim 2 also comprising biasing means operatively coupled to the locking actuator for axial biasing of the locking member toward the locked position.

6. The service tool as claimed in claim 5 wherein the biasing means includes a compression spring located between the locking actuator and the plunger actuator, said spring acting against the plunger actuator which is restricted from axial movement relative to the coupling arrangement via interaction of the axially directed keyway of the plunger member of the plunger actuator and the key member of the coupling arrangement.

7. The service tool as claimed in claim 1 wherein the plunger member of the plunger actuator is a tubular member of a blind configuration including a plurality of radially-directed fluid apertures at its blind end, said apertures being exposed on opening of the check valve to permit said fluid flow via the fluid pathway.

8. The service tool as claimed in claim 1 wherein the coupling arrangement includes a coupling head having an oval-shaped opening formed partly by opposing and internally directed flanges adapted on part rotation of the coupling head about the service port receiver to interlock with a corresponding rebate on said service port receiver.

9. The service tool as claimed in claim 8 wherein the coupling head and the service port receiver are configured wherein the releasable engagement of the locking member of the locking actuator with said service port receiver occurs during the interlock of the coupling head and said service port receiver.

10. In combination a service tool and service port receiver comprising:

(1) a service port receiver adapted for connection to a service port associated with a gearbox;

(2) a service tool comprising:

a coupling arrangement for releasable coupling with the service port receiver, said arrangement configured for rotational movement about the service port receiver between (a) a released position where the coupling arrangement is released from the service port receiver permitting axial movement of said coupling arrangement relative to said service port receiver, and (b) an engaged position where the coupling arrangement engages the service port receiver preventing axial movement of said coupling arrangement relative to said service port receiver, a locking actuator operatively coupled to the coupling arrangement and arranged for axial movement between (i) a locked position where the locking actuator releasably engages the service port receiver preventing rotation of the coupling arrangement thereby retaining it in the engaged position, and (ii) an unlocked position where the locking actuator disengages the service port receiver permitting rotation of the coupling arrangement to the released position for its release from said service port receiver;

a plunger actuator adapted for connection to a fluid conduit, said plunger actuator being slidably coupled to the coupling arrangement for movement between an open position and a closed position where in the open position, with the coupling arrangement in the engaged position and the locking actuator in the locked position, the plunger actuator is adapted to contact a check valve of the service port receiver and open it thereby permitting fluid flow between the gearbox and the fluid conduit via a fluid pathway formed at least in part by the plunger actuator;

the plunger actuator including a plunger member arranged for sliding movement within the coupling arrangement between the open and closed positions, the plunger member partly defining the fluid passageway;

the coupling arrangement including a coupling body surrounding at least part of the plunger actuator, and a key member having an operative end radially projecting inward of the coupling body for guided movement along an axially directed keyway formed in the plunger member of the plunger actuator during movement of said plunger actuator between its open and closed positions.

* * * * *